(12) United States Patent
Bingel

(10) Patent No.: US 6,314,180 B1
(45) Date of Patent: Nov. 6, 2001

(54) SYSTEM AND METHOD FOR PROVIDING A FREQUENCY DEPENDENT SYNTHETIC TERMINATION

(75) Inventor: Thomas J. Bingel, Bellair Beach, FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/039,862

(22) Filed: Mar. 16, 1998

Related U.S. Application Data
(60) Provisional application No. 60/069,301, filed on Dec. 11, 1997.

(51) Int. Cl.[7] .................................................. H04M 1/00
(52) U.S. Cl. ............................................ 379/398; 379/394
(58) Field of Search ..................................... 379/394, 398, 379/413

(56) References Cited

U.S. PATENT DOCUMENTS

| | | | |
|---|---|---|---|
| 5,121,080 | 6/1992 | Scott, III et al. | 330/260 |
| 5,504,811 | 4/1996 | Kiko et al. | 379/347 |
| 5,585,763 | 12/1996 | Navabi et al. | 330/255 |
| 5,747,893 | 5/1998 | Bennett et al. | 307/100 |
| 5,999,619 * | 12/1999 | Bingel | 379/394 |

* cited by examiner

*Primary Examiner*—Wing F. Chan
(74) *Attorney, Agent, or Firm*—Thomas, Kayden, Horstemeyer & Risley, L.L.P.

(57) ABSTRACT

A frequency dependent synthetic termination system varies a simulated impedance of a communications device as a function of signals received by the communications device. A feedback mechanism receives signals from a transmission line and attenuates the signals when the signals have a frequency within a predefined frequency range. The feedback mechanism then transmits the signals to a current source which drives the transmission line, thus simulating a termination impedance of the communications device based on the signals transmitted from the feedback mechanism. By varying the impedance of the communications device, the communications device can be designed to support communications of various frequencies over the transmission line.

36 Claims, 4 Drawing Sheets

SYSTEM AND METHOD FOR PROVIDING A FREQUENCY DEPENDENT SYNTHETIC TERMINATION

CROSS REFERENCE TO RELATED APPLICATION

This document claims priority to and the benefit of the filing date of provisional application entitled FREQUENCY DEPENDENT SYNTHETIC TERMINATION, assigned Ser. No. 60/069,301, filed by Bingel on Dec. 11, 1997, which is incorporated herein by reference as if set out in full hereinbelow.

FIELD OF THE INVENTION

The present invention relates generally to communication systems and, more specifically, to a system and method for providing a termination of a subscriber loop connection that is dependent on a frequency of signals transmitted across the subscriber loop connection.

BACKGROUND OF THE INVENTION

Many current communications systems transmit data across a subscriber loop communication line, referred to here in as a "subscriber line." The subscriber line is typically coupled to a communications network and to data communication equipment (DCE) at a customer's premises. For example, in the plain old telephone system (POTS), a subscriber line transfers data between a central office (CO) located within a public switched telephone network (PSTN) and a DCE, such as a modem or telephone, located at a customer's premises.

The PSTN is capable of supporting multiple types of communication signals. For example, the PSTN is designed to communicate voice signals associated with POTS communications, and the PSTN is also capable of data communication between data terminal equipment, such as computers, via the use of modems. T1 (1.544 Mbps) and Subrate Digital Service are other examples of data communication over the PSTN. Voice signals are typically communicated within a frequency band of 0 to 4 kilo-Hertz (KHz) while the frequency band of data signals vary with the type of data communication equipment utilized. However, data signals are frequently transmitted at frequency ranges much higher than the frequency band of voice signals. For example, data signals may be transmitted within a frequency range of 16 KHz to 80 KHz.

As known in the art, each end of the subscriber line should be terminated with a suitable impedance in order to enable communication of signals across the subscriber line. The amount of suitable impedance depends on the type of transmission medium and frequency band of the communication established on the subscriber line. For example, in voice signals associated with POTS communication, a relatively high termination impedance is desired while a relatively low termination impedance is desired for the communication of high frequency data signals. A typical termination impedance for POTS communication is between 600 and 900 Ohms, whereas a typical termination impedance for data communications within the 16 to 80 Klz band is approximately 135 Ohms.

Conventional communications networks usually terminate each end of the subscriber line with a single communications device. Therefore, the network utilizes conventional POTS splitters and POTS switches to route voice signals to POTS communications devices and to route data signals to data communications devices which support higher frequency ranges. Consequently, each communications device terminates its connection with a predetermined impedance suitable for the type and frequency band of communication supported by the communications device.

However, in order to increase the efficiency of data communication, it is desirable for each communications device to be capable of supporting either voice signals associated with POTS communication or of supporting data signals which communicate at higher frequencies. Accordingly, it is desirable for the communications device to adjust its termination impedance to correspond with the frequency band of the signals being communicated.

Thus, a heretofore unaddressed need exists in the industry for providing a system and method of varying an impedance of a communications device as a function of a frequency of the signals being communicated so that signals of different frequencies can be supported by the communications device.

SUMMARY OF THE INVENTION

The present invention overcomes the inadequacies and deficiencies of the prior art as discussed herein. The present invention provides a system and method for varying an impedance of a communications device as a function of a frequency of signals received by the communications device.

The present invention utilizes a current source and a feedback mechanism. The feedback mechanism receives signals from a transmission line and attenuates the signals when the signals have frequencies within a predefined frequency range. The feedback mechanism then transmits the signals as feedback signals to a current source which responds to the feedback signals in order to drive the transmission connection and thereby simulate a termination impedance of a communications device.

In accordance with another feature of the present invention, the predefined frequency range is defined by frequencies between 0 KHz and 4 KHz. Therefore, the termination impedance simulated by the frequency dependent synthetic termination system is relatively high for communications within the 0 KHz to 4 KHz frequency band and is relatively low for communications within the 16 KHz to 80 KHz frequency band.

The present invention can also be viewed as providing a method for varying an impedance value of a communications device as a function of a frequency of a signal received from a transmission line. Briefly described, the method can be broadly conceptualized by the following steps: receiving a signal from a transmission line, attenuating the signal when a frequency of the signal is within a predefined frequency range, transmitting the signal to a current source, and driving the transmission line with the current source based on the signal transmitted to the current source.

The present invention has many advantages, a few of which are delineated hereafter, as mere examples.

An advantage of the present invention is that the apparent termination of a communications device can be varied as a function of the frequency of signals received by the communications device.

Another advantage of the present invention is that a communications device can be designed to support the communication of signals of various frequencies. Therefore, the communications device can be designed to support both the communication of voice signals within a 0 K.Hz to 4 KHz frequency band and the communication of data signals within a 16 KHz to 80 KHz frequency band, for example.

Another advantage of the present invention is that both data and voice signals of various frequencies can be communicated through a communications network without the use of plain old telephone system (POTS) splitters since the same communications device can support both data and voices signals of various frequencies.

Other features and advantages of the present invention will become apparent to one skilled in the art upon examination of the following drawings in the detailed description. It is intended that all such features and advantages be included herein within the scope of the present invention, as is defined by the claims.

BRIEF DESCRIPTION OF THE DRAWINGS

The present invention can be better understood with reference to the following drawings. Like reference numerals designate corresponding parts throughout the several views. Moreover, the components in the drawings are not necessarily to scale, emphasis instead being placed on clearly illustrating the principles of the present invention.

DESCRIPTION OF THE PREFERRED EMBODIMENT

Figure 1:
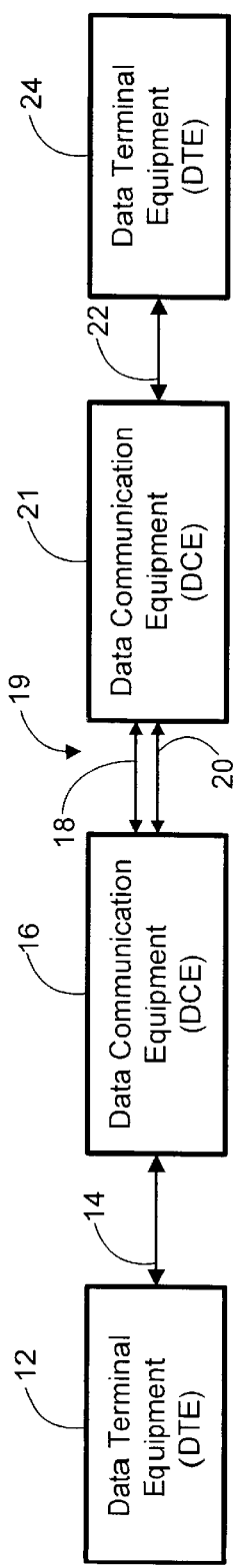
FIG. 1 is a block diagram illustrating a typical arrangement of and interrelationship between data terminal equipment (DTE) and data communication equipment (DCE) devices coupled over a transmission line in the environment of a publicly switched telephone network (PSTN)

FIG. 1 illustrates a block diagram of a current driven DCE device 16 shown in context with communication lines and data terminal equipment (DTE) devices. More specifically, FIG. 1 illustrates DTE device 12 connected via line 14 to DCE device 16. DTE device 12 may comprise a number of devices, including but not limited to a computer, printer, point-of-sale device, or a telephone. For example, where DTE device is a computer, DCE device 16 may comprise a modem and line 14 may comprise a serial connection between the DTE device 12 and the DTE device 16. DCE device 16 communicates with other DCE devices across input/output line 19. The input/output line 19 may be a subscriber loop line comprised of a two wire service, which wires are often denoted as TIP 18 and RING 20. Located at another end of input/output line 19 is DCE device 21 which communicates with DTE device 24 via line 22. As discussed above, DTE device 24 may comprise a number of devices, including, but not limited to a computer, printer, point-of-sale device, or a telephone, and DCE device 21 may comprise, but is not limited to, a modem.

Figure 2:
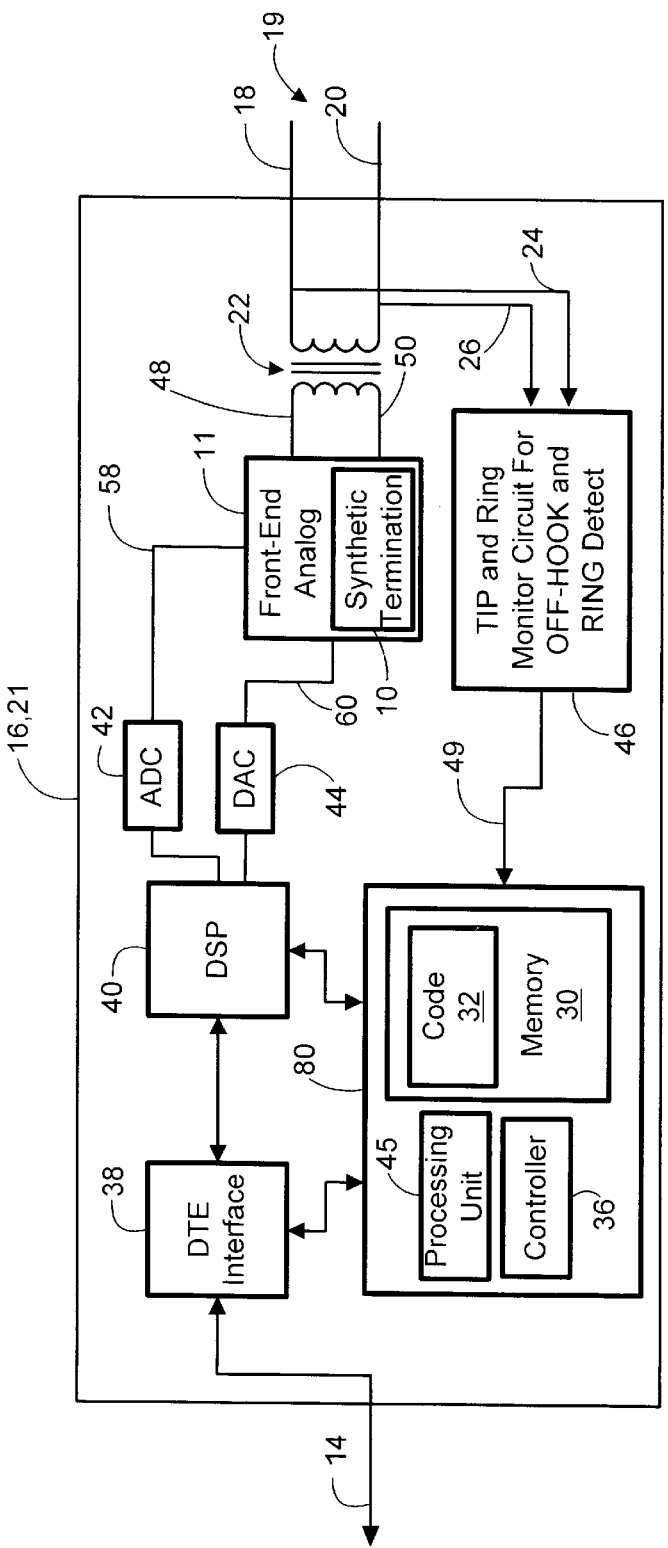
FIG. 2 is a block diagram illustrating a DCE device of FIG. 1 containing the synthetic termination system of the present invention.

FIG. 2 represents a schematic diagram of DCE devices 16 and 21. As discussed above, TIP 18 and RING 20 lines are coupled to an analog front-end circuit 11 which includes the frequency dependent synthetic termination system 10 via inductive coupling 22 and lines 48 and 50. A monitor circuit 46 includes a TIP and RING monitor circuit for off-hook and ring detection via lines 24 and 26. The monitor circuit 46 then provides a signal representative of the status of tip and ring lines 18 and 20 via connection 49 to the main control module 80 of the DCE device.

Data received from the input/output line 19 passes through the analog front-end 11, line 58 and is converted from analog to digital form by the analog-to-digital converter of block 42, before being passed to the digital signal processor 40. Conversely, outgoing data output from the DSP 40 is converted by the digital-to-analog circuitry 44, before being communicated to input/output line 19, by way of the analog front-end 11. Finally, a DTE interface 38 is in communication with the DSP 40 and in further communication across line 14, with the DTE 12, such as a computer, for example.

A control module 80 is in communication with the various other components of the DCE 16. While there are various ways to implement the control module 80, one way, as illustrated, is to further partition the control module 80 into functional units denoted as a processing unit 45, a memory 30 (which may further include an executable code segment 32) and a controller 36.

For purposes of the broad concepts of the present invention, the controller 80 receives a signal from the monitor circuit 46 on line 49 which provides controller 80 with information necessary to control the DSP 40 for the receipt and transmission of data. In this regard, the monitor circuitry 46 may be configured to detect an OFF-HOOK condition, or alternatively, a RING condition via lines 24 and 26. As is known in the art, the OFF-HOOK condition may be detected by a drop in voltage across the TIP and RING lines 18 and 20 within input/output line 19, or alternatively a sudden change in impedance on the input/output line 19. On the other hand, a RING detect condition is identified by a low frequency oscillatory voltage on input/output line 19. In short, the controller 80 evaluates the signal received on input/output line 19 for the purpose of controlling the DSP 40 and related componentry. Appropriate signals may, accordingly, be transmitted to the DSP for formulating data transmissions (or interpreting received data transmissions).

In accordance with an alternative embodiment of the invention, it will be appreciated that the analog-to-digital converter 42 and digital-to-analog converter 44 may be implemented as part of the DSP 40, to generate a signal in digital format which may be more readily evaluated and processed by the DSP 40. Additionally, the controller 80 may be a microprocessor, a microcontroller, an application specific integrated circuit (ASIC) or other digital circuitry configured to specially processed information. In the illustrated embodiment, the controller 80 includes fundamental components (processing unit 45, controller 36, memory 30) that together operate to perform distinct computing operations. Such operations may be controlled, for example, by executable code 32 contained within the memory 30.

Figure 3:
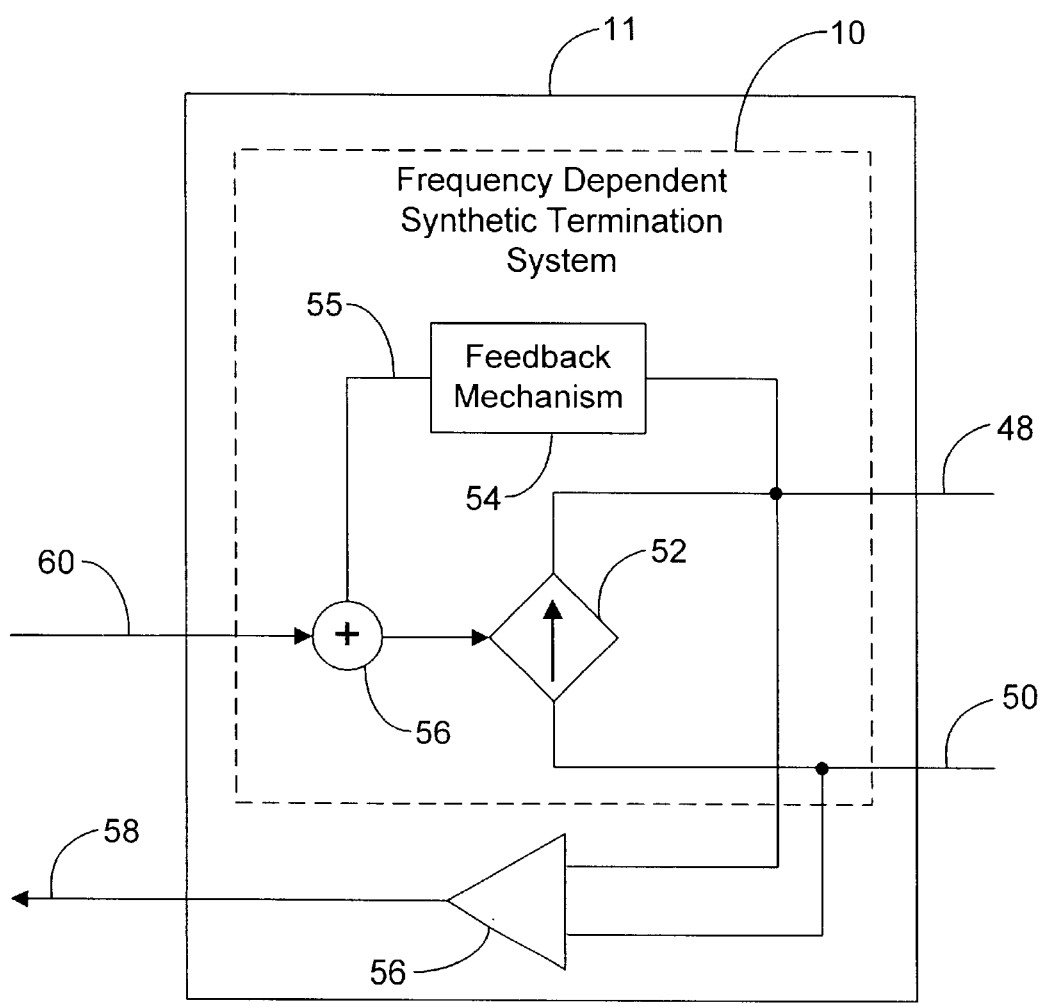
FIG. 3 is a schematic diagram illustrating a possible implementation of the synthetic termination system of FIG. 2.

Turning now to FIG. 3, a frequency dependent synthetic termination system 10 in accordance with the present invention is illustrated. The synthetic termination system 10 is situated within the front end analog circuitry 11 is illustrated. In accordance with the preferred embodiment of the present invention, a current source 52 is designed to drive the transmission medium (i.e., lines 48 and 50). The current source 52 typically has a current gain. For example, current through line 48 divided by current through line 55 is greater than unity. A differential amplifier 56 is designed to sense a voltage differential between lines 48 and 50 and to provide a signal 58 corresponding with the voltage differential to analog-to-digital converter 42 (FIG. 2) for further processing as described hereinbefore. A feedback mechanism 54 is configured to provide a feedback signal 55, via summation node 56, to current source 52 in order to force an apparent impedance across lines 48 and 50. Thus, any transmission line coupled to DEC device 16 or 21 senses a termination impedance simulated by the frequency dependent synthetic termination system 10.

Feedback mechanism 54 is designed to vary the feedback signal 55 as a function of the frequency of the signals on line 48. Therefore, the amount of impedance simulated by frequency dependent synthetic termination system 10 changes as the frequencies of the signals on line 48 change. Feedback mechanism 54 may include a high-pass filter, for example, that attenuates signals received from line 48 below a certain frequency range. In this regard, feedback mechanism 54 is designed to prevent low frequency signals from passing, and to allow high frequency signals to pass. Therefore, current source 52 is designed to receive unattenuated feedback signals 55 when the signals on line 48 are at a frequency range within a pass-band of feedback mechanism 54. Accordingly, the impedance simulated by frequency dependent synthetic termination system 10 at low frequencies is higher than that simulated at high frequencies.

It should be noted that although the preferred embodiment utilizes a single high-pass filter, feedback mechanism 54 may include other types of filters or combinations of filters in order to alter the pass-band of feedback mechanism to any suitable range. For example, feedback mechanism 54 may include a low-pass filter instead of high-pass filter so that feedback signals 55 of a low frequency range are allowed to force the simulated impedance. Furthermore, combinations of filters may be utilized so that feedback signals 55 of multiple frequency ranges are allowed to force the simulated impedance. It should be apparent to one skilled in the art that changing the pass-band of feedback mechanism 54 changes the impedance simulated by frequency dependent synthetic termination system 10. Therefore, any suitable termination impedance can be realized by altering the pass-band of feedback mechanism 54.

Figure 4:
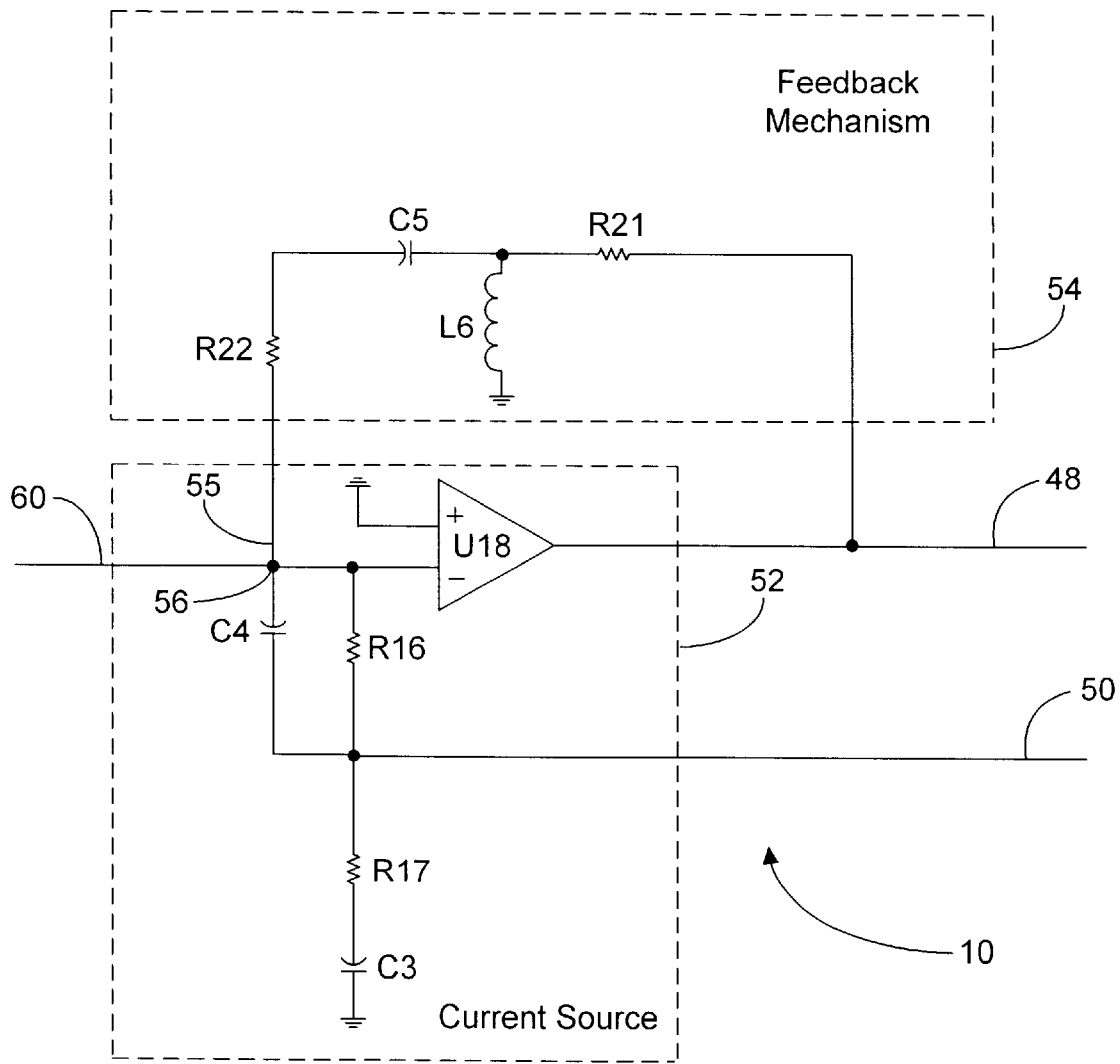
FIG. 4 is a circuit diagram illustrating a possible implementation of analog circuitry of the synthetic termination system of FIGS. 2 and 3.

FIG. 4 illustrates an arrangement of discrete analog componentry which may be arranged to implement the simulated termination impedance of front end analog circuitry 11 for the preferred embodiment of the present invention. Operational amplifier U18, resistors R16 and R17 and capacitors C3 and C4 form the current driven current source 52. Additionally, resistors R21 and R22, capacitor C5, and inductor L6 form the feedback mechanism 54. Specifically, capacitor C5 and inductor L6 are designed to operate as a high-pass filter that allows signals from line 48 within a predetermined frequency range to pass.

Preferably, the values of capacitor C5 and inductor L6 are chosen such that signals from line 48 pass without attenuation at frequencies above 16 kilo-Hertz (KHz). However, as the frequencies of the signals from line 48 decrease, the attenuation of the signals by feedback mechanism 54 increases. In this regard, capacitor C5 and inductor L6 preferably define a high-pass filter.

Table 1 depicts values for the components of FIG. 4 which successfully implements the principles of the present invention.

TABLE 1

| Component Number | Component Value |
|---|---|
| Resistor R16 | 60.4 Ohms |
| Resistor R17 | 10 Ohms |
| Resistor R21 | 150 Ohms |
| Resistor R22 | 150 Ohms |
| Capacitor C3 | 100 micro-Farads |
| Capacitor C4 | 15 nano-Farads |
| Capacitor C5 | 47 nano-Farads |
| Inductor L6 | 1 milli-Henry |

With the values depicted in Table 1, the frequency dependent synthetic termination system 10 is configured to provide a high simulated impedance, much greater than 600 Ohms, when the signals on line 48 correspond to POTS communications. However, as the frequency of the signals on line 48 increases, the simulated impedance of frequency dependent synthetic termination system 10 decreases at a rate of about 12 decibels/octave until an impedance of about 50 Ohms is reached. Therefore, the frequency dependent synthetic termination system 10 is designed to provide a simulated impedance of approximately 50 Ohms when the signals on line 48 have a frequency greater than the data-band of 16 KHz. Capacitor C3 rolls-off the current source gain at a very low frequency (about 160 Hz), while capacitor C4 rolls-off the current source gain at a very high frequency (about 180 KHz). These features are useful in controlling forward path gain, used to transmit signals from line 53 to lines 48 and 50. Accordingly, the frequency dependent synthetic termination system 10 of the preferred embodiment is configured to provide high and benign impedance in POTS communications in the 0 to 4 KHz band, yet provide suitable termination for data communications in the 16 KHz to 80 KHz band, for example. This is useful for POTS splitterless DSL-lite, proposed ANSI data communication standard.

It should be apparent to one ordinarily skilled in the art that the simulated impedance value may be changed by altering the values of Table 1. In this regard, altering the values of Table 1 may change the signal strength of feedback signals 55 and/or may change the pass-band of feedback mechanism 54. Furthermore, filters of different orders may be utilized. Any of these changes affects the impedance simulated by frequency dependent synthetic termination system 10, without altering the principles of the present invention.

OPERATION

The preferred use and operation of the frequency dependent synthetic termination 10 system and associated methodology are described hereafter.

Figure 5:
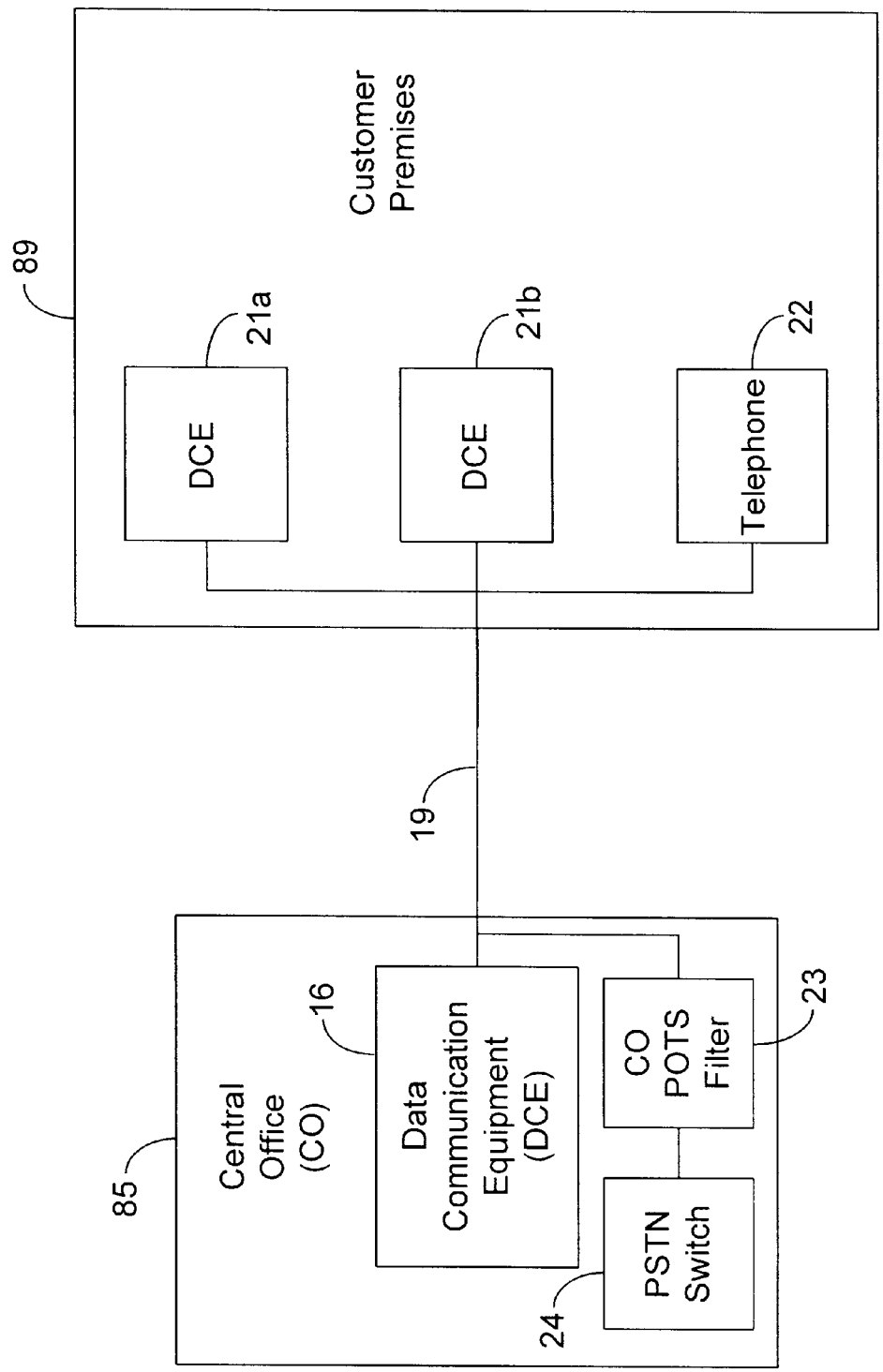
FIG. 5 is a block diagram illustrating a network of interconnected DCE devices employing the synthetic termination system of FIGS. 2 through 4.

FIG. 5 depicts an implementation of a DCE 16 utilizing the frequency dependent synthetic termination system 10 (FIG. 4) of the present invention. DCE 16 may be located at a central office (CO) 85 of a public switched telephone network (PSTN), for example, and DECs 21a and 21b may be located at a customer premises 89 serviced by the PSTN. As known in the art, central office 85 typically includes a POTS filter 23 and a PSTN switch 24 to communicate POTS signals between central office 85 and customer premises 89. Co-pending U.S. patent application entitled, "System and Method of Bridging Multiple Communication Devices to a Single Communication Connection," assigned Ser. No. 08/996,709, filed by Bingel on Dec. 23, 1997, and co-pending U.S. patent application entitled "Synthetic Termination," assigned Ser. No. 08/992,351, filed by Bingel on Dec. 17, 1997, which are both incorporated herein by reference as if set out in full hereinbelow, disclose DCEs 16 and 21 capable of driving a current signal across a subscriber line utilizing a simulated termination impedance.

Assume that PSTN switch 24, communicates POTS signals, for example, with telephone 22. Since the POTS signals are in a low frequency range (e.g., between 0 and 4 KHz), feedback mechanism 54 (FIG. 3) of DCE 16 provides attenuation to the signals received from line 48 (FIG. 2). Therefore, the DCE 16 utilizing the frequency dependent synthetic termination system 10 of the present invention forces a high simulated termination impedance, for example, above 600 Ohms. This high simulated termination impedance is sufficient to enable POTS communication between the PSTN switch 24 and telephone 22.

Assume that communication across subscriber line 19 switches to a transfer of data between DCE 16 and DCE 21*b* at a higher frequency band, for example, between 16 KHz and 80 KHz. In this case, feedback mechanism 54 (FIG. 3) of DCE 16 creates a suitable termination to enable high frequency data signals from line 48 (FIG. 3) to pass. Accordingly, high frequency feedback signals 55 (FIG. 3) force a simulated impedance lower than the simulated impedance existing during the communication of POTS signals. For example, the simulated termination impedance forced during communication within the higher frequency band of 16 KHz to 80 KHz should approximately equal 50 Ohms when the values of Table 1 are utilized. It should be apparent to one skilled in the art upon reading this disclosure, that the exact high frequency termination resistance can be scaled to 100 Ohm or 135 Ohm for communication of the higher frequency signals between DCE 16 and DCE 21*b*. Therefore, by varying the simulated impedance as a function of the frequency of the signals communicated on line 19, the frequency dependent synthetic termination system 10 (FIG. 3) enables efficient simultaneous communication of POTS signals between POTS switch 24 and telephone 22, and higher frequency data transmission between DCE 16 and DCE 21*b*, over line 19.

It should be noted that the synthetic the frequency dependent synthetic termination system 10 of the present invention is particularly suited for operation with the communications device disclosed in co-pending U.S. patent application entitled, "Apparatus and Method for Communicating Voice and Data between a Customer Premises and a Central Office," filed on Nov. 3, 1997, by Bremer et al. and assigned Ser. No. 08/962,796 which is incorporated herein by reference as if set forth in full hereinbelow.

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the pending claims.

Now, therefore, the following is claimed:

1. A system for varying a termination impedance value of a communications device, comprising:
   a current source responsive to feedback signals for driving a transmission line; and
   a feedback mechanism configured to receive a signal from said transmission line and to transmit said feedback signal to said current source, said feedback mechanism configured to produce said feedback signal from said received signal with attenuation when said received signal has a frequency within a predefined frequency range and without attenuation when said received signal has said frequency outside said predefined frequency range,
   wherein a change in a strength of said feedback signal changes said termination impedance value.

2. The system of claim 1, wherein said transmission line is a subscriber line associated with a public switched telephone network.

3. The system of claim 1, wherein said termination impedance value is a simulated value.

4. The system of claim 1, wherein said predefined frequency range includes frequencies between 0 kilo-Hertz and 4,000 kilo-Hertz.

5. The system of claim 1, wherein said predefined frequency range is associated with a plain old telephone system (POTS).

6. The system of claim 1, wherein said feedback mechanism is configured to attenuate voice signals and is configured to allow data signals from a computer system to pass.

7. The system of claim 1, wherein said feedback mechanism includes a high-order filter for attenuating said received signal.

8. The system of claim 1, wherein said feedback mechanism includes a low-order filter for attenuating said received signal.

9. The system of claim 1, wherein said current source comprises:
   an operational amplifier having a first input connection coupled to ground and a second input connection coupled to said feedback mechanism;
   a resistor having a first end and a second end, said first end of said resistor coupled to said second input connection and said second end of said resistor coupled to said transmission line; and
   a capacitor having a first end and a second end, said first end of said capacitor coupled to said second input connection and said second end of said capacitor coupled to said transmission line.

10. The system of claim 1, wherein said termination impedance value exceeds 600 Ohms when said feedback signals are attenuated.

11. The system of claim 9, wherein said first input connection is a non-inverting connection of said operational amplifier and said second input connection is an inverting input of said operational amplifier.

12. The system of claim 10, wherein said termination value is between approximately 50 and 135 Ohms when said feedback signal is without attenuation.

13. A method for varying an impedance value of a communications device as a function of a frequency of a signal received from a transmission line, comprising the steps of:
   receiving said signal;
   attenuating said signal when said frequency of said signal is within a predefined frequency range;
   transmitting said signal to a current source; and
   driving said transmission line with said current source based on said signal transmitted to said current source.

14. The method of claim 13, wherein said transmission line is a subscriber line associated with a public switched telephone network.

15. The method of claim 13, wherein said impedance value is a simulated value.

16. The method of claim 13, wherein said predefined frequency range includes frequencies between 0 kilo-Hertz and 4,000 kilo-Hertz.

17. The method of claim 13, wherein said predefined frequency range is associated with a plain old telephone system (POTS).

18. The method of claim 13, wherein said impedance value exceeds 600 Ohms when said signals are attenuated.

19. The method of claim 18, wherein said impedance value is between approximately 50 and 135 Ohms when said signal is without attenuation and is received by said current source.

20. A system for varying an impedance value of a communications device as a function of a frequency of a signal received from a transmission line, comprising:

means for receiving said signal;

means for attenuating said signal when said frequency of said signal is within a predefined frequency range;

means for transmitting said signal to a current source; and means for driving said transmission line with said current source based on said signal transmitted to said current source.

21. The system of claim 20, wherein said transmission line is a subscriber line associated with a public switched telephone network.

22. The system of claim 20, wherein said impedance value is a simulated value.

23. The system of claim 20, wherein said predefined frequency range includes frequencies between 0 kilo-Hertz and 4,000 kilo-Hertz.

24. The system of claim 20, wherein said predefined frequency range is associated with a plain old telephone system (POTS).

25. The system of claim 20, wherein said impedance value exceeds 600 Ohms when said signals are attenuated.

26. The system of claim 25, wherein said impedance value is between approximately 50 and 135 Ohms when said signal is substantially unattenuated and is received by said current source.

27. A system for varying a simulated impedance of a communications device as a function of a frequency of a signal received from a communications connection, comprising:

a filter configured to receive said signal from said communications connection and to attenuate said signal when said signal has a frequency within a predefined frequency range; and a current source configured to receive said signal from said filter and to drive said communications connection based on said signal, said current source configured to respond to a change in a value of said signal in order to change said simulated impedance of said communications device.

28. The system of claim 27, wherein said communications connection is a subscriber line associated with a public switched telephone network.

29. The system of claim 27, wherein said predefined frequency range includes frequencies between 0 kilo-Hertz and 4,000 kilo-Hertz.

30. The system of claim 27, wherein said predefined frequency range is associated with a plain old telephone system (POTS).

31. The system of claim 27, wherein said filter is configured to attenuate voice signals and is configured to allow data signals from a computer system to pass.

32. The system of claim 27, wherein said filter is a high pass filter for attenuating signals having a frequency range below a predefined threshold.

33. The system of claim 27, wherein said current source comprises:

an operational amplifier having a first input connection coupled to ground and a second input connection coupled to said filter;

a resistor having a first end and a second end, said first end of said resistor coupled to said second input connection and said second end of said resistor coupled to said communications connection; and a capacitor having a first end and a second end, said first end of said capacitor coupled to said second input connection and said second end of said capacitor coupled to said communications connection.

34. The system of claim 27, wherein said simulated impedance value exceeds 600 Ohms when said signals are attenuated.

35. The system of claim 33, wherein said first input connection is a non-inverting connection of said operational amplifier and said second input connection is an inverting input of said operational amplifier.

36. The system of claim 34, wherein said simulated impedance value is between approximately 50 and 135 Ohms when said signals are allowed to pass through said filter.

* * * * *